US006970608B1

(12) United States Patent
Michael

(10) Patent No.: US 6,970,608 B1
(45) Date of Patent: Nov. 29, 2005

(54) METHOD FOR OBTAINING HIGH-RESOLUTION PERFORMANCE FROM A SINGLE-CHIP COLOR IMAGE SENSOR

(75) Inventor: David Michael, Wayland, MA (US)

(73) Assignee: Cognex Technology and Investment Corporation, Mt. View, CA (US)

(*) Notice: Subject to any disclaimer, the term of this patent is extended or adjusted under 35 U.S.C. 154(b) by 571 days.

(21) Appl. No.: 10/036,644

(22) Filed: Dec. 30, 2001

(51) Int. Cl.$^7$ .............................................. G06K 9/32
(52) U.S. Cl. ...................... 382/299; 382/167; 382/275; 358/1.2; 358/518
(58) Field of Search ............................... 382/164, 165, 382/167, 260, 274, 275, 299, 162; 358/1.2, 358/3.26, 3.27, 512, 518

(56) References Cited

U.S. PATENT DOCUMENTS

| 5,917,553 A * | 6/1999 | Honey et al. ................ 348/578 |
| 6,292,218 B1 * | 9/2001 | Parulski et al. ........... 348/220.1 |
| 6,330,029 B1 * | 12/2001 | Hamilton et al. ............ 348/272 |
| 6,343,146 B1 * | 1/2002 | Tsuruoka et al. ............ 382/163 |
| 6,466,618 B1 * | 10/2002 | Messing et al. ........ 375/240.01 |
| 6,567,119 B1 * | 5/2003 | Parulski et al. ........... 348/207.2 |
| 6,670,986 B1 * | 12/2003 | Ben Shoshan et al. .. 348/219.1 |
| 6,678,000 B1 * | 1/2004 | Sakata ......................... 348/369 |

* cited by examiner

Primary Examiner—Bhavesh M. Mehta
Assistant Examiner—Y Kassa
(74) Attorney, Agent, or Firm—Russ Weinzimmer

(57) ABSTRACT

A method is provided for obtaining high-resolution performance from a standard image sensor, such as a single-chip image sensor. Since single-chip color image sensing is often the least expensive way to obtain color images, the invention helps to lower the cost of high-resolution machine vision performance. The color image produced by the single-chip image sensor is processed in two ways at run-time. In one stage of run-time, processing is performed on the original color image provided by the image sensor, including normal low-resolution image processing and low-resolution machine vision analysis. In another stage of run-time, a high-resolution search model is determined to search the color image using knowledge of the geometric properties of the arrangement of the pixels of the low-resolution image sensor, and the sub-pixel phase of the high-resolution search model. The invention can as much as double the accuracy of machine vision analysis using a standard color camera.

10 Claims, 9 Drawing Sheets

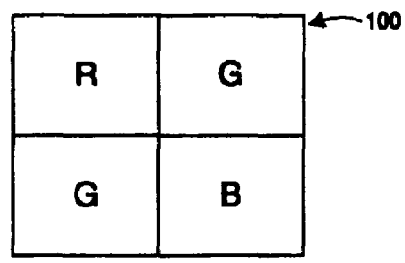
FIGURE 1A
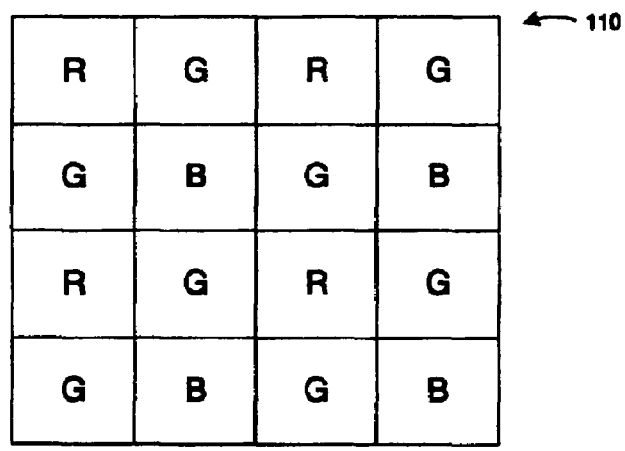
FIGURE 1B
FIGURE 3

| Rₐ | G_b | R_c | G_d |
|---|---|---|---|
| G_e | B_f | G_g | B_h |
| R_i | G_j | R_k | G_l |
| G_m | B_n | G_o | B_p |

← 402

φ₂ — 405:

| G_a | R_b | G_c | R_d |
|---|---|---|---|
| B_e | G_f | B_g | G_h |
| G_i | R_j | G_k | R_l |
| B_m | G_n | B_o | G_p |

← 404

φ₃ — 407:

| G_a | B_b | G_c | B_d |
|---|---|---|---|
| R_e | G_f | R_g | G_h |
| G_i | B_j | G_k | B_l |
| R_m | G_n | R_o | G_p |

← 406

φ₄ — 409:

| B_a | G_b | B_c | G_d |
|---|---|---|---|
| G_e | R_f | G_g | R_h |
| B_i | G_j | B_k | G_l |
| G_m | R_n | G_o | R_p |

← 408

| $R_a$ $(G_e + G_b)/2$ $B_f$ | $R_c$ $(G_d + G_g)/2$ $B_h$ |
|---|---|
| $R_i$ $(G_j + G_m)/2$ $B_n$ | $R_k$ $(G_l + G_o)/2$ $B_p$ |

← 502

| $R_b$ $(G_a + G_f)/2$ $B_e$ | $R_d$ $(G_c + G_h)/2$ $B_g$ |
|---|---|
| $R_j$ $(G_i + G_n)/2$ $B_m$ | $R_l$ $(G_k + G_p)/2$ $B_o$ |

← 504

| $R_e$ $(G_a + G_f)/2$ $B_b$ | $R_g$ $(G_c + G_h)/2$ $B_d$ |
|---|---|
| $R_m$ $(G_i + G_n)/2$ $B_j$ | $R_o$ $(G_k + G_p)/2$ $B_l$ |

← 506

| $R_f$ $(G_b + G_e)/2$ $B_a$ | $R_h$ $(G_d + G_g)/2$ $B_c$ |
|---|---|
| $R_n$ $(G_j + G_m)/2$ $B_i$ | $R_p$ $(G_l + G_o)/2$ $B_k$ |

METHOD FOR OBTAINING HIGH-RESOLUTION PERFORMANCE FROM A SINGLE-CHIP COLOR IMAGE SENSOR

BACKGROUND OF THE INVENTION

This invention relates to machine vision, and particularly to applications of machine vision that exploit color imaging.

Color imaging, and other forms of multi-spectral imaging (e.g., imaging that includes near infra-red electromagnetic energy) is useful for facilitating various machine vision tasks, such as alignment and inspection. For example, see U.S. Pat. No. 6,141,033; Michael, et al., issued Oct. 31, 2000, entitled "Bandwidth Reduction of Multi-channel Images for Machine Vision".

Color or multi-spectral images are obtained using a color (or multi-spectral) camera. Some color cameras use a prism with multiple dichroic coatings to split an image into multiple single-color images. Each single-color image is acquired simultaneously using a separate respective CCD or CMOS image sensor array. Although this method provides a high-resolution multi-color image at high speed, it is the most costly to implement.

Another method for acquiring a color image is to sequentially filter the light from a scene using a rotating multi-color filter wheel and a single CCD or CMOS array to sequentially acquire each of the different single color images. Although this method is less expensive, and provides a high-resolution color image, it is slow, and also suffers from the disadvantage that each single color (e.g., red green, or blue) image is acquired at a different time.

A third method for acquiring a color image uses a single-chip CCD or CMOS sensor array. All three colors are acquired on the same sensor array at the same time. Although CMOS and CCD sensors detect the entire visible light spectrum (and sometimes the near-infrared as well), incident light must be separated into different spectral bands for color imaging. Separation is accomplished by depositing colored filter materials (usually dyed or pigmented polymers) sequentially on the top surface of the sensor array, arranged in a mosaic pattern known as a color filter array (CFA). Photolithographic patterning of the different color layers produces the desired mosaic array.

Several CFA patterns can be used. A common arrangement is a four-pixel repeat cell 100, called the "Bayer pattern". Each repeat cell 100 consists of two green (G), one red (R), and one blue (B) filter, as shown in FIG. 1A. This results in an alternating pattern of rows 110, wherein a first row consists of red and green alternating filters, and a second row consists of blue and green alternating filters, as shown in FIG. 1B. Thus, in the Bayer pattern, the pixels are not evenly divided. In fact, there are as many green pixels as there are blue and red combined.

Some single-sensor cameras can use alternatives to the Bayer filter pattern, such as repeating a repeating pattern of red, green, and blue stripes. Some single-chip image sensors don't add up the different values of red, green and blue, but instead subtract values using the typesetting colors cyan, yellow, and magenta.

One advantage of this method is that only one image sensor array is required to acquire a complete color image, and all the color information (e.g., red, green and blue) is recorded at the same moment.

The raw output from a color image sensor with a Bayer filter pattern is a mosaic of red, green and blue (RGB) pixels of potentially different intensity. A single-chip color image sensor using an array with n×n pixel resolution is used to generate a three-color RGB image with n×n pixels for each color plane (or color band). However, on the chip only 25% of the pixels are devoted to blue, and 25% of the pixels are devoted to red, whereas 50% of the pixels are devoted to green. (The greater number of green pixels is intended to simulate the relatively greater sensitivity of the human eye to green light.) Therefore, the resolution of the raw data for each color plane is much less than n×n pixels.

These lower resolution color plane images can be combined to create an apparently full-resolution color composite image through application of a Bayer pattern de-mosaic algorithm. This algorithm derives a red, green, and blue intensity value for each pixel location based on the values of the surrounding pixels. However, no new information is actually added by this step, since this is done by color "interpolation" from nearest-neighbor Bayer cells. For example, the red and blue signals at a green-sensitive pixel are estimated from the red or blue signal values on neighboring red- or blue-sensitive pixels. This interpolation step is equivalent to up-sampling and low-pass filtering.

Although less expensive than using a prism, and faster than sequentially acquiring multiple single-color images, this third approach to acquiring a color image yields an effectively low-resolution color image, since all colors are represented in a single color image. Consequently, using known methods, only low-resolution machine vision tasks can be performed using the color image obtained from a single-chip image sensor.

High-resolution machine vision tasks require high-resolution image data. For example, to get highly accurate results when locating an image of an object using a search vision algorithm, high-resolution input image data is required. Due to the low resolution of each color plane of a single-chip color image sensor, a low-cost standard color camera that incorporates such an image sensor is typically not used for high-resolution machine vision applications.

SUMMARY OF THE INVENTION

In a general aspect of the invention, a method is provided for high-resolution (high-res) location of an object in an image using a single-chip color image sensor. In general, the sensor is sensitive to N bands of electromagnetic energy, and the sensor is characterized by a sensor geometry. The method includes: providing a high-res color model of an object, and acquiring a color image of an object with the color image sensor. An alignment location of the high-res color model is found in the color image so as to provide a single low-res location. Also, a true-phase high-res color model having correct phase is obtained using the phase of the single low-res location, and using the sensor geometry. A high-res location of the true-phase high-res color model is found in the acquired color image.

In a preferred embodiment, finding the alignment location of the high-res color model in the color image includes: providing N low-res single-band locations, one low-res single-band location for each of the N bands; and combining the N low-res single-band locations into a single low-res location.

In a further preferred embodiment, combining the N low-res single-band locations includes: combining the N low-res single-band locations into a single low-res location using a weighted sum, each location being associated with a weighting factor. The weighting factor can incorporate a confidence factor.

In a preferred embodiment, using the phase of the single low-res location, and using the sensor geometry, so as to provide a true-phase high-res color model having correct phase includes: selecting one of N candidate high-res color models by using the phase of the single low-res location, or synthesizing a synthetic model.

In a preferred embodiment, the sensor geometry is based on the Bayer pattern. In an alternate preferred embodiment, the sensor geometry is based on a three-color striped pattern.

In yet another preferred embodiment, providing a high-res color model of an object includes: creating a high-res synthetic model of the object, or acquiring a high-res image of the object using a high-res camera, or acquiring a low-res image at each phase inherent in the sensor geometry.

In a further preferred embodiment, N is 3, and the bands represent red, green, and blue. The bands can also represent cyan, yellow, and magenta, or green, red, and infra-red. N can also be 4, as when the bands represent blue, green, red, and infra-red.

The method of the invention makes it possible to obtain high-resolution performance from a standard image sensor, such as a single-chip image sensor. Since single-chip color image sensing is often the least expensive way to obtain color images, the invention helps to lower the cost of high-resolution machine vision performance.

The method of the invention can improve the accuracy of machine vision analysis steps using a standard color camera by as much as a factor of two.

The maximum difference between model and acquired image is half a pixel, assuming no scale difference and no rotation difference.

BRIEF DESCRIPTION OF THE DRAWING

The invention will be more fully understood by reference to the detailed description, in conjunction with the following figures, wherein:

FIG. 1A is a Bayer pattern cell;

FIG. 1B is a complete Bayer pattern of pixel filters including a plurality of the cells of FIG. 1A;

FIG. 3 is a representation of a high-resolution color image, wherein each pixel includes RGB values;

FIG. 4 is a representation of four sparsely populated high-res color images, one for each of four phases;

FIG. 5 is a representation of four possible desired low-resolution models, wherein each pixel is the average RGB value over a Bayer pattern cell of the high-resolution model of FIG. 4;

DETAILED DESCRIPTION

Figure 2:
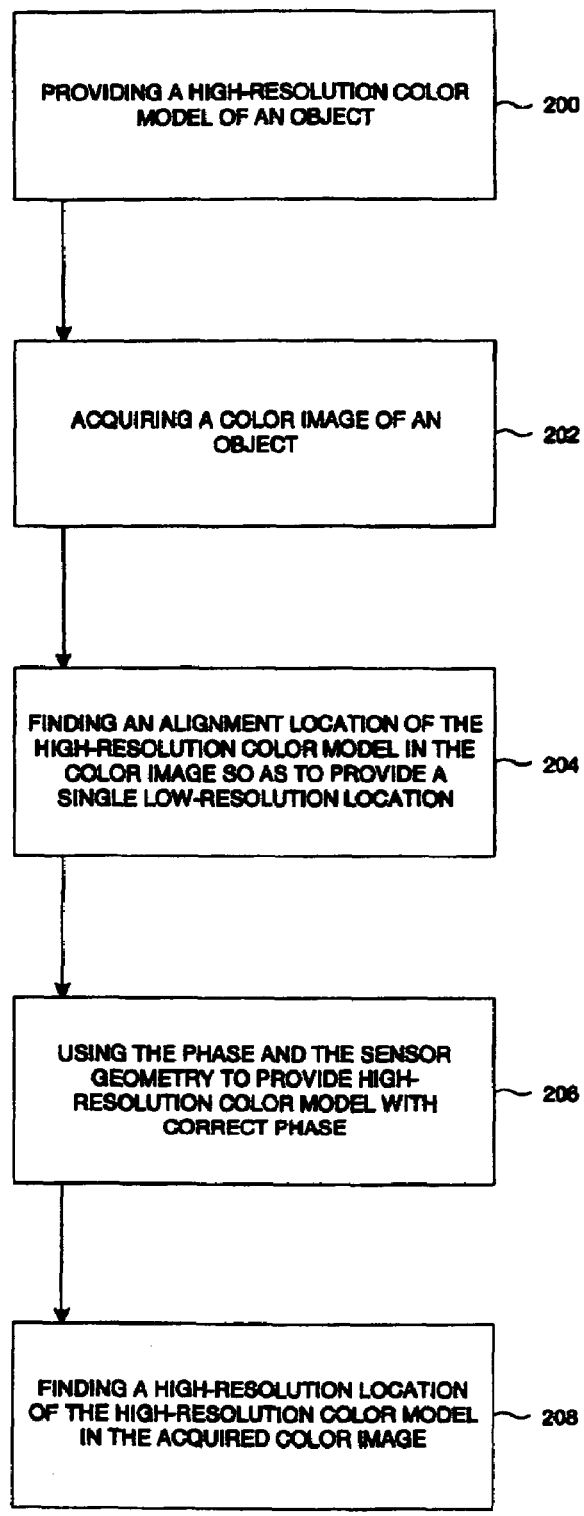
FIG. 2 is a flow chart illustrating a general method of the invention.

Referring to FIG. 2, the method of the invention includes first providing a high resolution color model of an object 200. This step 200 involves obtaining R, G, B (red, green, blue) or other color band values for each pixel in the image, as shown in FIG. 3, that will be part of the alignment model at high resolution, where high resolution means the resolution of a multi-chip color image sensor wherein each chip has the same dimensions, and has the same number of pixels, as the single-chip sensor; and constructing the alignment model from that high resolution image. The specifics of the alignment model are known in the art, and depend on the technique for alignment. For example, for a correlation-based alignment technique, the model may consist of pixel values. For a geometric-based alignment technique, the model may consist of geometric descriptions.

Obtaining the values in the color bands can be done in several ways. One way is by acquiring an image of the object using a multi-sensor imager. The resulting acquired image is illustrated by FIG. 3. Note that each pixel 300 has full color band information. The high-resolution color alignment model is constructed from that acquired high-resolution image, as explained above.

A second way is to synthetically generate the color bands and consequently the high-resolution color alignment model from CAD data, or from a synthetically rendered high resolution image.

A third way is to use a single chip sensor and acquire multiple images of the object at all possible phases, such as illustrated by FIG. 4. For the bayer pattern, this is accomplished by translating either the camera or the object by one pixel in the x-direction, next by one pixel in the y-direction, and finally by one pixel in the x-direction and one pixel in the y-direction compared with the initial alignment of camera and object. Note that the position of the object will have moved by one pixel and the location will need to be adjusted.

The multiple images of the object at all possible phases can be combined into a single high-resolution color image by copying the missing values from phases that are not missing those values. Doing this is a two step process: step one is to detect the phase from multiple image acquisitions. This can be done by assigning "phase 1" to the first acquired image, and by aligning the subsequent images to that first image, and then using FIG. 7 to assign the subsequent images to phases 1, 2, 3 and 4 (702). If the camera or object motion can be very accurately controlled so that single pixel motions can be easily obtained, alignment will not be necessary. Step two is to combine the images corresponding to the phases into a single high resolution image, as shown in FIG. 3.

Referring to FIGS. 3 and 4, to illustrate this process, it is helpful to consider an example. An example is the upper left pixel 300 which consists of values Ra, Ga, Ba. It is the combination of the upper left pixel Ra 403 from the image 402 associated with phase 1 of FIG. 4, and the upper left pixel Ga 405 from the image 404 associated with phase 2, and Ba 409 from the image 408 associated with phase 4. Note that Ga could also have been obtained from Ga 407 from the image 406 associated with phase 3 of FIG. 4, or alternatively, Ga could have been obtained as the average of Ga 405 and Ga 407. The high-resolution color alignment model can be constructed from this single high-resolution color image.

Referring again to FIG. 2, in step 202, a color image of an object is acquired with a color image sensor, such as a single chip color image sensor. The color image can be treated in two different ways, as illustrated by FIG. 3A.

Figure 3A:
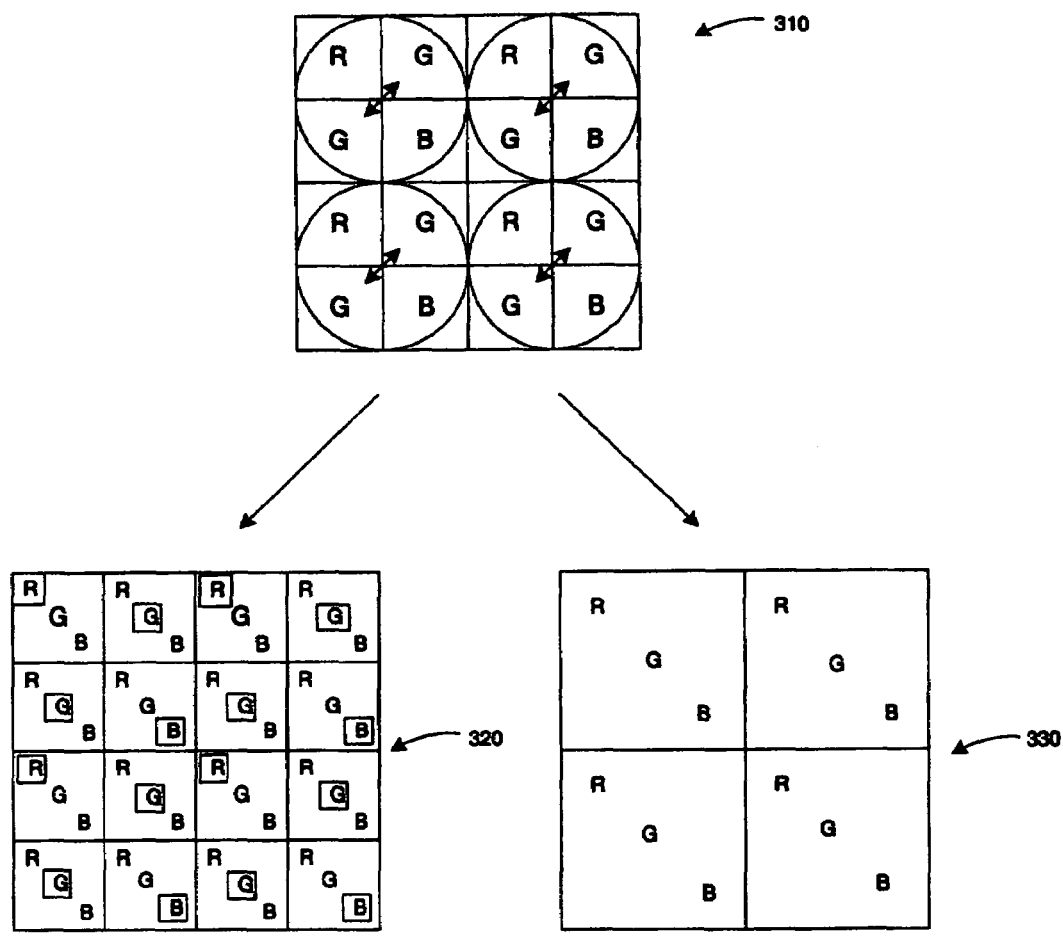
FIG. 3A is set of three pixel diagrams illustrating how a Bayer pixel array can be treated as a low-res array of RGB pixels, or as a sparsely populated high-res color image, according to the invention.

A first way is to treat the color image acquired with a single-chip color image sensor as a low-resolution color image 330 as shown in FIG. 3A. The first way is known in the art, and is how single-chip color image sensors are conventionally used. Color pixel values at locations in between spatial sampling locations (the R, G, B values of the CFA) can be interpolated, and the image spatial frequencies are assumed to follow the requirements for interpolation. (Note that interpolation is equivalent to upsampling and low pass filtering.)

As recognized by the invention, a second way to treat the color image acquired with a single-chip color image sensor is to handle the color image as N sparsely sampled single-band images, as illustrated by array 320 in FIG. 3A,, where in the case of an RGB color image, N=3. Each single band image is at high resolution, but sparsely sampled. In other words, most (⅔) of the pixel components R, G, B (red, green, blue) are missing at each spatial location in the image.

Figure 2A:
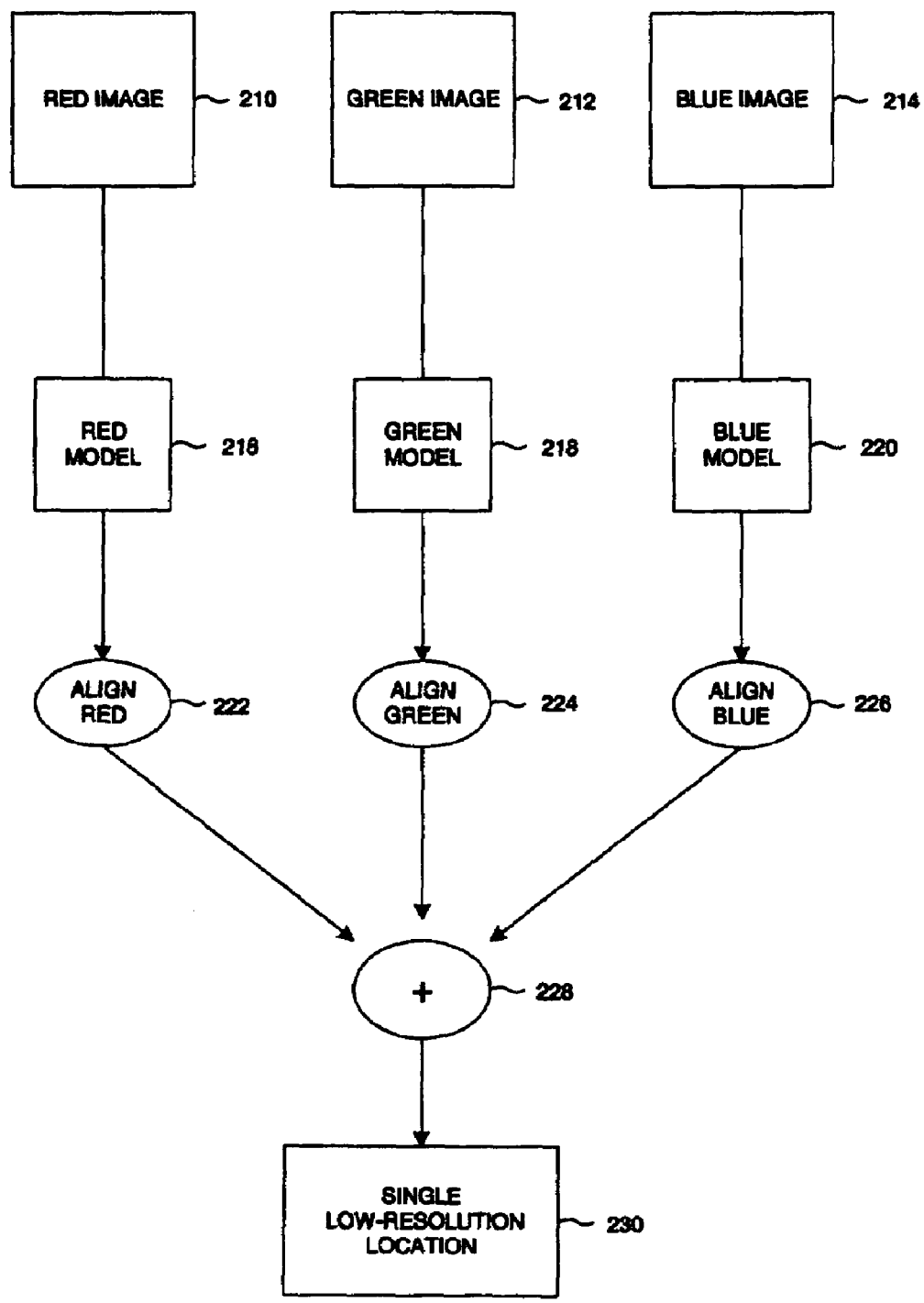
FIG. 2A is a representation of the N separate low-resolution alignment steps for each of the N bands, one each for R,G, and B.

Referring again to FIG. 2, in the step of finding the alignment of the high-res color model 204, the color image is treated as a low resolution color image wherein the pixel values between sampled colors have been interpolated or equivalently, that each band of the color image is low resolution. We find the location of the object in this low-resolution color image by finding the location of the object in each band independently, as illustrated by FIG. 2A, and combining the resulting locations to provide a single low-resolution location.

Specifically, a red image 210 is aligned 222 using a red model 216 so as to provide a location to a combiner 228. Likewise, a green image 212 is aligned 224 using a green model 218 so as to provide a location to the combiner 228, and a blue image 214 is aligned 226 using a blue model 220 so as to provide a location to the combiner 228. The combiner 228 then provides a single low-resolution location 230.

Figure 2B:
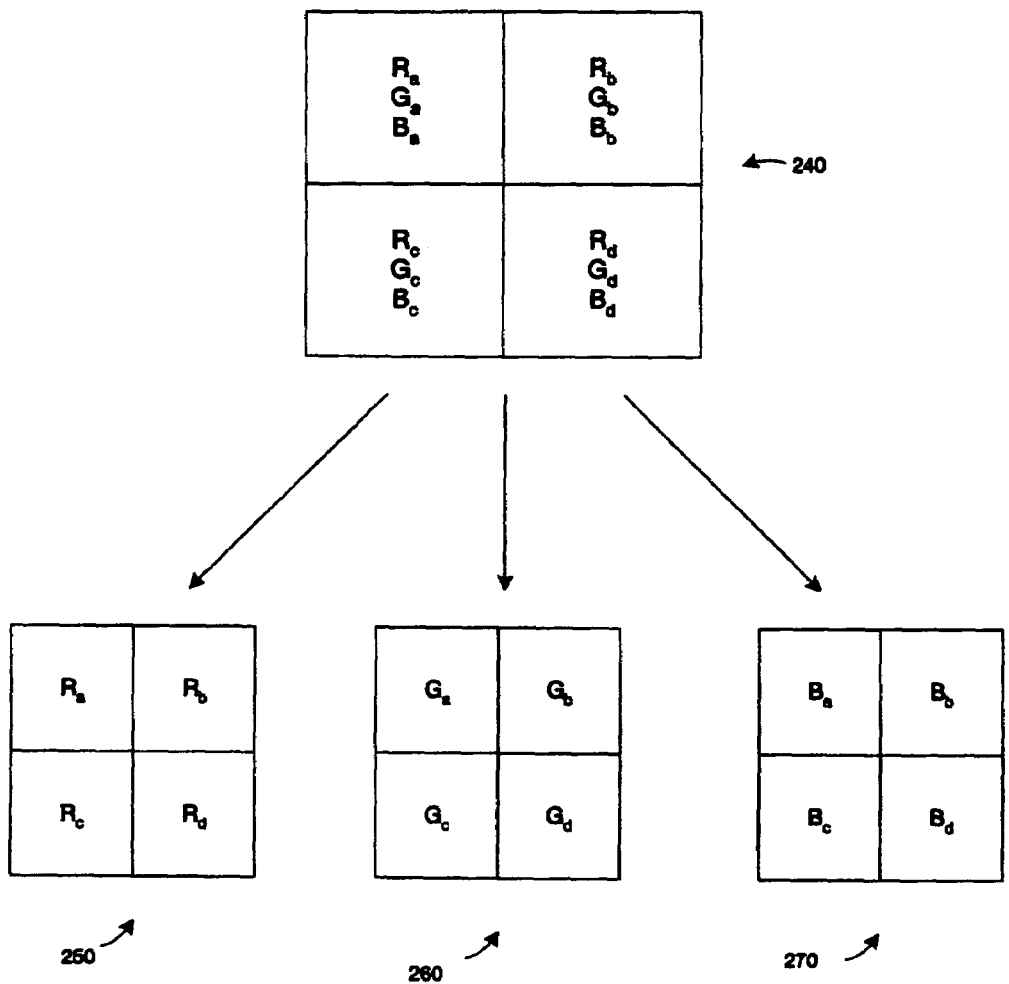
FIG. 2B is a representation of a decomposition of a color image into a plurality of single band images, each image being usable for object location.
Figure 6:
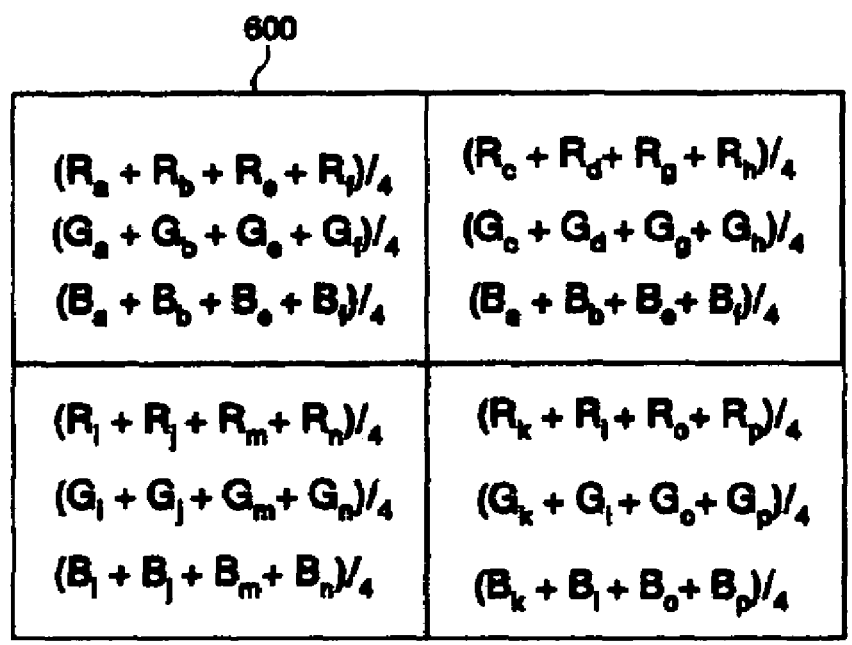
FIG. 6 is a representation of a low-resolution color image constructed from a high-resolution color image.

FIG. 2B illustrates how a color image 240 can be decomposed into N single-band images 250, 260, 270 that can each be separately used for determining object location. Using the high-resolution model to find an object in a low-resolution single-band image is done by reducing the resolution of the single-band version of that high-resolution model. One way of doing this is to reduce the resolution of the image used to train the high resolution model, as shown for example in FIG. 6 where the low-resolution image is one quarter the resolution of the high-resolution model, where each low-resolution pixel 600 includes an average R,G, and B value as shown.

Next, the low-resolution model is trained from the low-resolution image, resulting in a desired low-resolution model 502,504,50,508 or FIG. 5, depending on the phase, as yet unknown. Another way of reducing the resolution of the model is to directly reduce the resolution of the model itself, as is known in the art.

The found locations of the object in each band can be combined in a plurality of ways, as represented by the combiner 228 in FIG. 2A. One way is to use a weighting factor for each found location. The weighting factor can represent relative confidence in the associated found location. The found locations are each multiplied by an associated weighting factor, and these terms are added together to provide the single low-res location. The weighting factors can be normalized, such that the sum of all of the weighting factors can be 1, for example.

Another way to combine the found locations is to use a geometric mean of the locations. Alternatively, an arithmetic mean can be used. Also, the location associated with a maximum confidence can be selected as the single low-res location.

Figure 7:
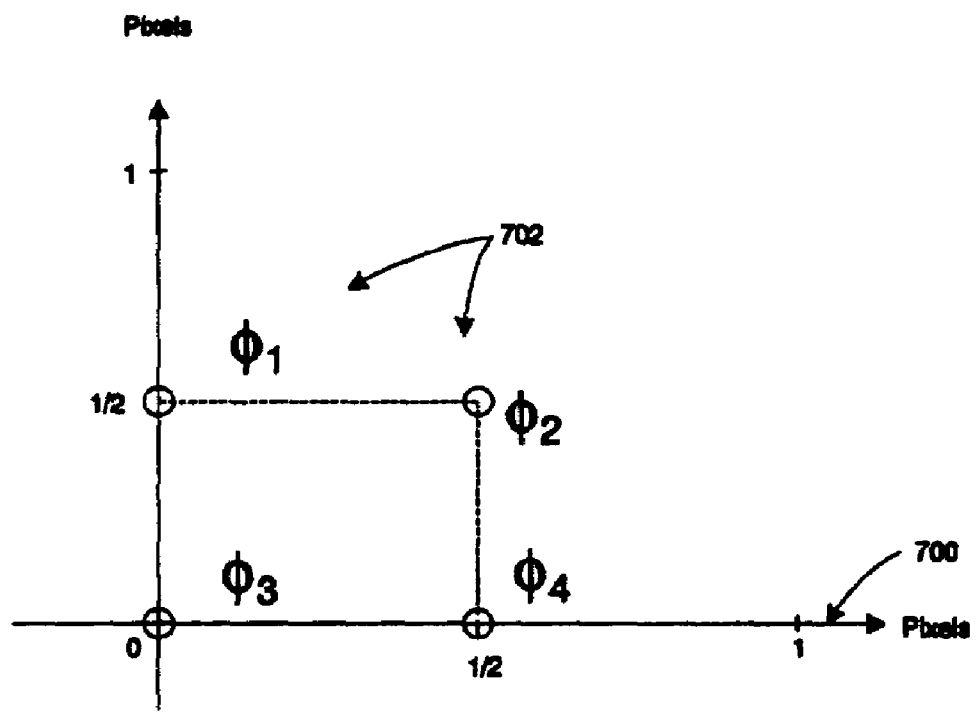
FIG. 7 is a representation of four sub-pixel phases, and the location of the sub-pixel phases in relationship to a pixel grid.

Referring again to FIG. 2, the step of providing a true-phase high-res color model 206 involves comparing the single low-res location with four possible sub-pixel phases 702, labeled p1, p2, p3, and p4 in the context of a pixel grid 700 of FIG. 7. The closest of the four phases is associated with the most representative high-resolution model of the four high-res models 402, 404, 406, 408 shown in FIG. 4. In an embodiment where the sensor geometry involves only three phases, such as the RBG stripe geometry, there would be only three high-res models. In general, there will be as many high-res models as there are phases inherent in the sensor geometry.

Referring again to FIG. 2, in the step of finding the high-res location of the true-phase high-res color model in the acquired color image 208, it is now possible to perform high-resolution alignment. Here, the color image provided by the single-chip color image sensor is treated as a high-resolution color image, albeit a sparsely sampled color image. Thus, using the true-phase high-res color model to search the sparsely sampled high-resolution color image that was originally acquired by the single-chip color image sensor, a high-resolution location of the true-phase high-res color model can be found.

Note that this step is probably only correcting the results from the low-resolution alignment by less than 1 pixel. Consequently, it may be possible to optimize the alignment algorithm by reducing the area to be searched. Also, note that nothing in this approach limits alignment to translation only. For example, it can be used for translation, rotation, scale, general affine transformation or perspective alignment as well.

Other variants and embodiments will occur to those skilled in the art, without departing from the spirit and scope of the invention. Accordingly, the invention is not intended to be limited by the detailed description, except as set forth in the following claims.

What is claimed is:

1. A method for high-resolution (high-res) location of an object in an image using a single-chip color image sensor that is sensitive to N bands of electromagnetic energy, the sensor having a sensor geometry, comprising:
   providing a high-res color model of an object;
   acquiring a color image of an object with the color image sensor;
   finding an alignment location of the high-res color model in the color image so as to provide a single low-res location having a phase, including providing N low-res single-band locations, one low-res single-band location for each of the N bands, and combining the N low-res single-band locations into a single low-res location;
   using the phase of the single low-res location, and using the sensor geometry, so as to provide a true-phase high-res color model having correct phase; and
   finding a high-res location of the true-phase high-res color model in the acquired color image.

2. The method of claim 1, wherein combining the N low-res single-band locations includes:
   combining the N low-res single-band locations into a single low-res location using a weighted sum, each location being associated with a weighting factor.

3. The method of claim 2, wherein the weighting factor includes a confidence factor.

4. The method of claim 1, wherein the sensor geometry is based on the Bayer pattern.

5. The method of claim 1, wherein providing a high-res color model of an object includes:
creating a high-res synthetic model of the object.

6. The method of claim 1, wherein providing a high-res color model of an object includes:
acquiring a high-res image of the object using a high-res camera.

7. The method of claim 1, wherein providing a high-res color model of an object includes:
acquiring a low-res image at each phase inherent in the sensor geometry.

8. The method of claim 1, where N is 3, and the bands represent red, green, and blue.

9. The method of claim 1, wherein using the phase of the single low-res location, and using the sensor geometry, so as to provide a true-phase high-res color model having correct phase includes:
selecting one of N candidate high-res color models by using the phase of the single low-res location.

10. The method of claim 1, wherein using the phase of the single low-res location, and using the sensor geometry, so as to provide a true-phase high-res color model having correct phase includes:
synthesizing a synthetic model.

* * * * *